Jan. 1, 1935.  W. H. PARKER  1,986,747
PISTON METER
Filed Feb. 18, 1932
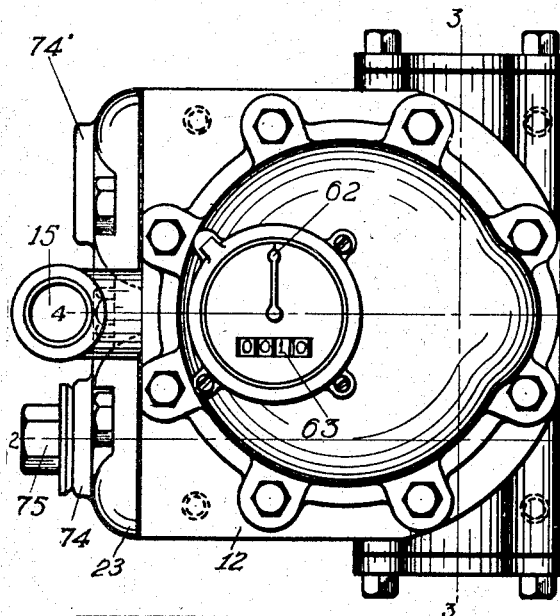
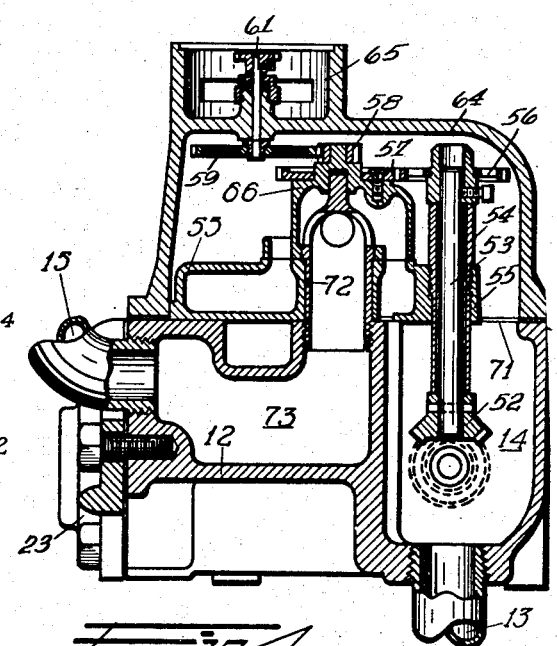
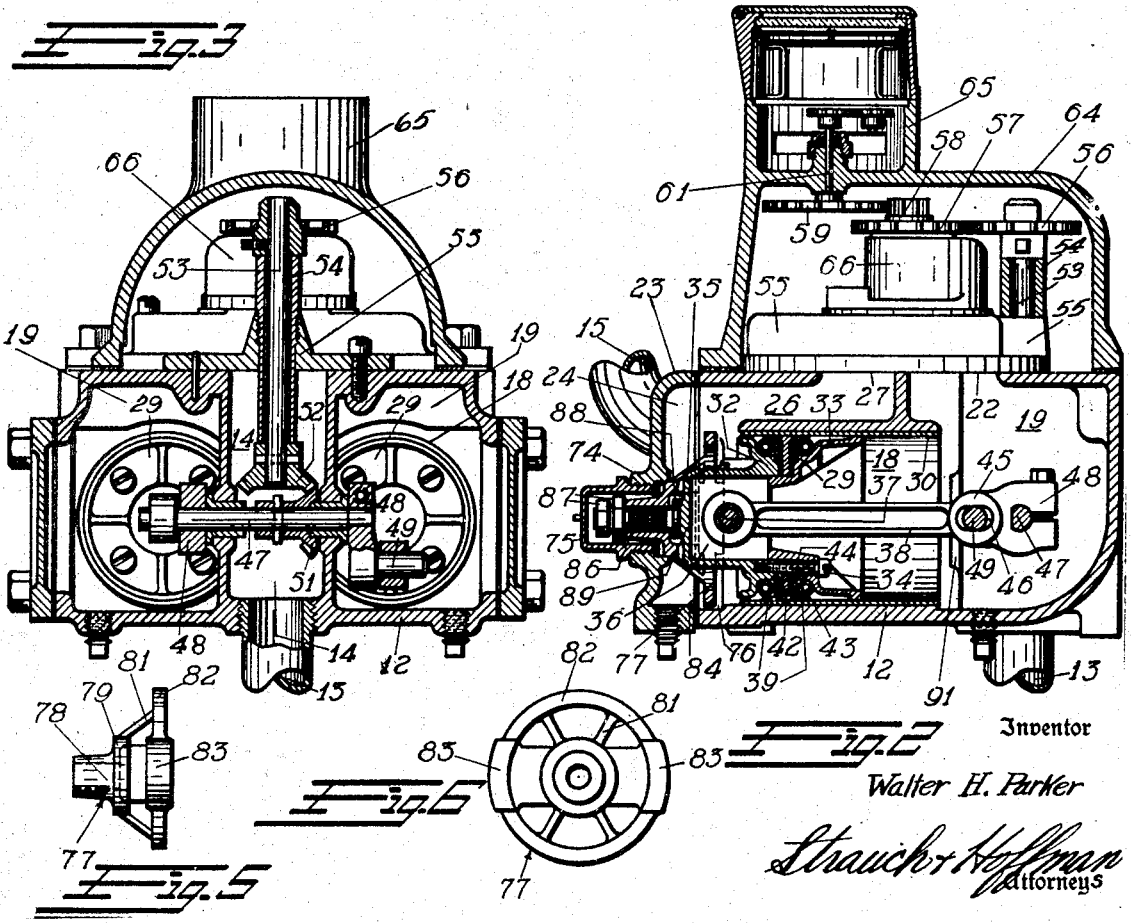
Inventor
Walter H. Parker
Strauch + Hoffman
Attorneys Patented Jan. 1, 1935

1,986,747

UNITED STATES PATENT OFFICE 1,986,747

PISTON METER

Walter H. Parker, Pittsburgh, Pa., assignor to Pittsburgh Equitable Meter Company, Pittsburgh, Pa., a corporation of Pennsylvania Application February 18, 1932, Serial No. 593,912

5 Claims. (Cl. 73—30)

This invention relates to fluid metering mechanisms for accurately indicating the volume of fluids passing through the meter, and more particularly the invention relates to a meter of the double acting piston type. Although the meter of this invention is not limited thereto, it is particularly adapted for use in gasoline dispensing systems wherein the gasoline is rapidly passed from a storage tank to tanks of automobiles or other vehicles.

In dispensing gasoline, it is necessary that the meters be extremely accurate with relatively small limits, and inaccurate meters are condemned and may not be used until the inaccuracy is corrected and the meter re-tested. Due to the relatively rough handling of mechanisms of this type, meters for use in this class of service must be rugged and the mechanism must be able to maintain its accuracy under severe usage. Furthermore these meters must be capable of large quantity production and the parts must be readily interchangeable to facilitate servicing of the meters.

In meters of the reciprocating piston type, it sometimes happens that the pistons stop in a position which results in a hydraulic lock. In this position the valve mechanism stops so that the outlet of the meter is closed and therefore pressure on the pistons may not reciprocate them and the parts are locked in this stationary position. Heretofore, attempts have been made to correct for this defect by the setting of the valves, adjustment of the cranks, or other mechanisms. However, in some instances the means used to correct the hydraulic lock are relatively expensive, and in some cases the mechanism becomes readily deranged due to the rough handling by operators of gasoline dispensing systems.

One object of this invention, therefore, is to provide a liquid meter of the reciprocating piston type having relatively simple means incorporated therein for preventing the hydraulic lock of the meter.

Another object of this invention is to provide a liquid meter of the reciprocating piston type having means to readily and simply calibrate the meter by adjusting the delivery flow so that the registration thereof may be made to conform with the necessary accuracy without disassembling the parts of the meter.

Another object of this invention is to provide a liquid meter of the reciprocating piston type wherein the hydraulic lock thereof is prevented by providing a slight play or lost motion between the pistons and the cranks thereof, with stops for the pistons.

Another object of this invention is to provide a liquid meter of the reciprocating piston type wherein a lost motion is provided between each piston and its crank, whereby the hydraulic lock is prevented, with a simple adjustable stop for cooperation with one or more of the pistons to readily calibrate the meter by thus adjusting the throw of at least one piston.

Another object of this invention is to provide a mechanism which may be readily associated with liquid meters of the piston type now in use to prevent the hydraulic lock of the meter and to provide means for calibration of same, the mechanism being associated with the meters at a minimum expense.

This application is a continuation in part of the application of Walter H. Parker and Nelson J. Seibert, Serial No. 538,545, filed May 19th, 1931, for Piston meters.

The above and various other objects of this invention will be apparent from the following description and appended claims when taken in conjunction with the accompanying drawing wherein:

Figure 1 is a top plan of a meter embodying this invention.

Figure 2 is a section taken substantially on line 2—2 of Figure 1.

Figure 3 is a section taken substantially on line 3—3 of Figure 1.

Figure 4 is a section taken substantially on line 4—4 of Figure 1.

Figure 5 is a detail of the mounting for the adjustable stop for one piston.

Figure 6 is an end view thereof.

Referring to the drawing wherein like characters indicate like parts, the main body of the meter comprises a supporting casing 12 having a plain upper surface provided with a series of ports therein communicating with the hollow interior of the casing. The casing 12 is provided with an inlet connection 13 communicating with the vertically extending inlet chamber 14, and with an outlet connection 15 extending from one end face of the meter. Within the casing 12 are two parallel cylinders 18 having open ends adjacent the side of the meter to which the outlet opening 15 is connected. The open rear ends of the cylinders 18 communicate with individual chambers 19 on opposite sides of the inlet chamber 14, as seen in Figure 2. Each chamber 19 has an opening 22 through the upper face of the casing 12.

The end of the casing 12 through which the outlet connection 15 extends is normally closed by a cylinder head cover 23, provided with bolt holes in alignment with threaded holes in the casing 12 for the reception of bolts for securing the cylinder head in fluid tight engagement with the casing. The cylinder head 23 has recesses 24 therein in alignment with the open ends of cylinders 18, each recess 24 being in communication with an individual passage 26 within casing 12. As seen in Figure 3, each passage 26 has an opening 27 through the upper face of casing 12.

The two cylinders and pistons are similar and only one cylinder and piston will be described. Each cylinder 18 is preferably provided with a removable, non-corrosive lining 30 therein such as brass or bronze and in which the piston 29 reciprocates. Each piston includes a body portion 32 and a follower 33, formed preferably of a non-corrosive metal and a light metal respectively. The body 32 has a plurality of threaded openings to receive bolts 34 which secure the body and follower in united relation. The body of the piston is further provided with a central forwardly extending lug 35 in which is retained block 36 carrying the wrist pin 37. The wrist pin 37 is connected to the connecting rod 38. It will be noted from Figure 2 that the bolts 34 which hold the piston body and follower assembled, also hold the wrist pin block 36 securely in position within the hollow lug 35.

As seen in Figure 2 each piston has a relatively wide groove in its perimeter for the reception of sealing means within which are fixed two flexible sealing rings 39 preferably of leather or the like positioned on opposite sides of a central retaining ring 42. Retaining ring 42 has its faces curved to cause the flexible sealing rings 39 to be bent in opposite directions as clearly seen in the drawing. Beneath the over-hanging portions of the sealing rings 39 are coil springs 43 retained in position by the retaining ring 42 and metallic washers 44 seating against the leather rings 39. When these parts are assembled as seen in Figure 2 the bolts 34 secure the parts in position.

In piston meters of this type a very accurate adjustment becomes necessary between the stroke of the piston and position of the valve. For example, in the ordinary piston meter with the one piston and crank shaft in the position shown in Figure 2, a slight opening of the intake valve of the other cylinder prior to the opening of the exhaust valve of the cylinder shown would produce a pressure in the other cylinder without releasing the liquid in the cylinder shown, with the result that both pistons would become locked. Provision is made in the present device to prevent hydraulic lock caused by maladjusted valves. Each connecting rod 38 is provided with a boss 45 having an opening 46 therein which is elongated in the direction of reciprocation of the piston as seen in Figure 2. These elongated slots in the ends of the connecting rods, in combination with the stops for the pistons, effectively eliminate the hydraulic lock previously encountered in meters of this type. The slotted connecting rods permit the crank shaft to rotate a limited amount at the ends of the piston strokes without movement of the piston starting its exhaust stroke, so that the valve is moved sufficiently to open the exhaust port of the cylinder.

A crank shaft 47 extends across the casing 12 through the inner chamber 14 and is suitably supported by bearings in the walls separating the chamber 14 from the chambers 19. This crank shaft has flat portions near its ends and has secured thereto crank arms 48 carrying crank pins 49 extending through the elongated openings 46 of the connecting rods 48.

The crank shaft 47 has secured thereto within the inlet chamber 14 miter gear 51 in mesh with and driving a similar gear 52 secured to a vertical shaft 53. Shaft 53 extends upwardly through sleeve 54 which is carried by a stationary valve member 55 suitably secured to the upper face of casing 12 by bolts or pins.

At its upper end the shaft 53 has secured thereto a gear 56 in mesh with the gear 57 which has secured thereto a pinion 58 which meshes with a gear 59 secured to register shaft 61. Shaft 61 extends upwardly into a register casing and serves to drive the registering hand and counter mechanism by a suitable reduction gearing. Although other types of mechanism may be used this invention is shown in connection with a register wherein a hand 62 moves around the periphery of the dial to register quarts of liquid passing through the meter, and a counter 63 registers the total gallons of liquid passed.

The gears 56, 57, 58, 59 and the stationary valve member 55 are enclosed within a housing member 64 which is suitably secured to the upper face of casing 12. The housing 64 has an upwardly extending cup shaped member 65 for supporting the register mechanism, and for also supporting the shaft 61, and forms a distributing chamber for the liquid entering the meter.

Suitably mounted on the upper face of the stationary valve member 55 is a rotary valve member 66 having secured thereto the gear 57. The inlet chamber 14 is in communication by way of passage 71 with the distributing chamber defined by casing 64 and the rotary valve 66 controls the inlet and outlet of fluid through the stationary valve member 55. The rotary valve member 66 is supported upon a cup member 72 secured to casing 12. The cup member 72 is hollow and the upper bearing for the rotary valve is connected to the body portion by a spider to allow the passage of fluid into the cup shaped member. During operation of the meter, the crank shaft 47 drives the vertical shaft 53 to rotate the rotary valve 66. This rotation allows liquid to pass from the distributing chamber defined by the casing 64 to opposite ends of the cylinders through the rotary valve 66 and the passages in the hollow stationary valve member 55. The rotary valve also controls the passageway of fluid through the discharge opening by way of the stationary valve 55, rotary valve 66, the cup 72, and to the discharge chamber 73, which is in communication with the outlet 15.

The rotary and stationary valve mechanism and the cup member 72 are all clearly shown and their operation described in copending application Serial No. 538,545, of which this application is a continuation-in-part.

The lost motion between the connecting rods 38 and the crank pins 49 is taken advantage of in this invention to accurately calibrate the reading of the meter by regulating the stroke of at least one of the pistons 29. This is accomplished by the provision of a readily adjustable stop shown more clearly in Figure 2. It will be noted that the cylinder head or cover 23 is provided with bosses 74 in alignment with the cylinders. These bosses are preferably internally threaded to receive either a plug member or an adjusting cap. The cap 75 is shown in connection with the lower piston of Figure 1, and is adapted to close the opening through the boss 74 and may be readily removed for calibrating the meter. In alignment with the ends of the cylinders the casing 12 has a groove 76 therein and extending around the casing except where the passageway 26 connects with recesses 24. A supporting member 77 shown in detail in Figures 5 and 6 is adapted to be supported in groove 76 and comprises an internally threaded sleeve 78 adapted to be positioned in one hollow boss 74. The inner end of the sleeve member 78 is enlarged as at 79 and has projecting therefrom a plurality of spider members 81 secured at their outer ends to an annular ring member 82. The main body portion of the annular member 82 is of slightly less diameter and slightly narrower than the annular groove 76 in the casing 12, as seen in Figure 2. Ring member 82 has two opposite enlarged lug portions 83 which, as seen in Figures 5 and 6, are both wider and of greater diameter than annular member 82. These lug members 83 are of the same width as the recess 76 and of the same diameter, to snugly fit therein. When the member 77 is positioned as shown in Figure 2 with the lugs 83 within the annular recess 76, the cylinder head or cover member 23 engages against the lugs 83 to securely hold member 77 in position. This is accomplished by having the annular recesses 24 provided in the cylinder head 23 of slightly less diameter than the recess 76 in the casing 12. Therefore when assembled as seen in Figure 2, the annular shoulder 84 on cover member 23 will engage lugs 83 to hold member 77 in position.

A stop member 86 is adapted to be threadedly engaged with the sleeve 78 of member 77, its position of adjustment being secured by locknuts 87 threaded on the end thereof. Member 86 has an enlarged head 88 which is adapted to engage a centrally projecting lug 89 on the end of the piston 29 to serve as a stop therefor. Threaded member 86 may have a screw driver kerf in its end to facilitate its adjustment.

As seen in Figure 1, an adjustment is shown for only one of the pistons. It has been found that sufficiently accurate calibration of the meter may be secured by adjusting the stroke of one piston, although an adjustable stop for both pistons may be used if desired. In order to avoid the possibility of a hydraulic lock of the meter, the lost motion connection between the connecting rod 38 and the crank pin 49 for both pistons is provided, and two stationary stops are used on the piston which is not adjusted for calibration purposes. Any suitable stationary stop may be provided in the casing 12 or on the cover 23, such as a plug member threaded into the boss 74' of Figure 1 and having its end in position to engage the central lug 89 of that piston.

Suitable stationary stops 91 are provided in the casing 12 for the opposite ends of the pistons, comprising shoulders or lugs to engage the skirts of the pistons.

It is believed that the operation of the meter as a whole will be apparent from the foregoing description. Liquid may enter the inlet 13 into inlet chamber 14 and pass upwardly through opening 71 into the distributing chamber formed by cover 64. The rotary position of valve 66 determines which ends of the cylinders are exposed to the pressure of the incoming liquid. Since the cranks 48 are connected at 90° angles on the shaft 47, there is never a position of dead center for the meter. The pressure of the liquid causes reciprocation of the pistons and the liquid is delivered in measured quantities from both ends of the cylinders through the stationary valve member 55, rotary valve member 66, the cup member 72, to discharge chamber 73 and then to outlet 15. Rotation of the valve member 66 also causes rotation of the gear 59 and shaft 61 to register the quantity of liquid on the registering mechanism 63, also causing rotation of the hand 62. The stops for the piston in combination with the lost motion between the connecting rods and the cranks effectively prevent hydraulic lock of the meter.

By removal of the cap 75 and the loosening of lock-nuts 87, the adjustable stop may be adjusted to vary the position of the stop lug 88. Thus the meter may be readily calibrated without disassembly of the parts thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a liquid meter of the reciprocating piston type, a casing having cylinders therein, a piston in each cylinder, valve mechanism for controlling the flow of liquid through said meter, register operating mechanism, means for driving said mechanisms from said pistons, said means including a connection for permitting lost motion, and an adjustable stop device for limiting the stroke of one piston, including a supporting member, a shoulder in said casing against which said supporting member is adapted to engage, and a removable cylinder head cover engaging said supporting member and rigidly clamping the same in position against said shoulder.

2. The invention as defined in claim 1 wherein said supporting member includes a sleeve having a portion projecting forwardly therefrom for engagement against said shoulder, and a stop supported by and projecting through said sleeve for adjustment.

3. The invention as defined in claim 1 wherein said cylinder head cover has an opening therethrough substantially in alignment with one cylinder, and said supporting member includes a sleeve positioned in said opening and an annular portion projecting forwardly from said sleeve and engaging said shoulder, and a stop adjustably supported by and projecting through said sleeve to engage one piston.

4. A liquid meter comprising a casing having two parallel cylinders therein, a piston in each cylinder, a crank shaft, cranks on said crank shaft having crank pins, connecting rods pivoted to said pistons and having elongated openings engaged over said crank pins to allow a limited lost motion between said pistons and crank pins, valve mechanism and register mechanism operated by said crank shaft, said cylinders having open ends adjacent one wall of said casing, a cover closing the open ends of said cylinders, a shoulder within said casing adjacent the open end of one cylinder, and a stop device for adjustably limiting the stroke of the piston in said one cylinder, said device including a sleeve and a forwardly projecting ring adapted to engage said shoulder, said cover having an opening into which said sleeve extends, a piston stop threaded into said sleeve and accessible through the opening in said cover, a cap closing the opening in said cover, and a shoulder on said cover engaging the ring of said stop device and maintaining the same against the shoulder in said casing.

5. A fluid measuring apparatus comprising a casing having a cylinder therein, a piston in said cylinder, valve mechanism controlling the admission and discharge of fluid to said cylinder, a crank shaft having a crank thereon, a connecting rod pivotally connected to said piston and crank through a slotted connection to permit lost motion, and an adjustable stop to limit the stroke of said piston.

WALTER H. PARKER.